July 7, 1970
R. G. FOSTER
3,518,732
PIPE FORMING MACHINE WITH ROTATABLE PLATFORM CARRYING
ROTATABLE SUPPORTING PLATE
Filed Dec. 4, 1967
3 Sheets-Sheet 1
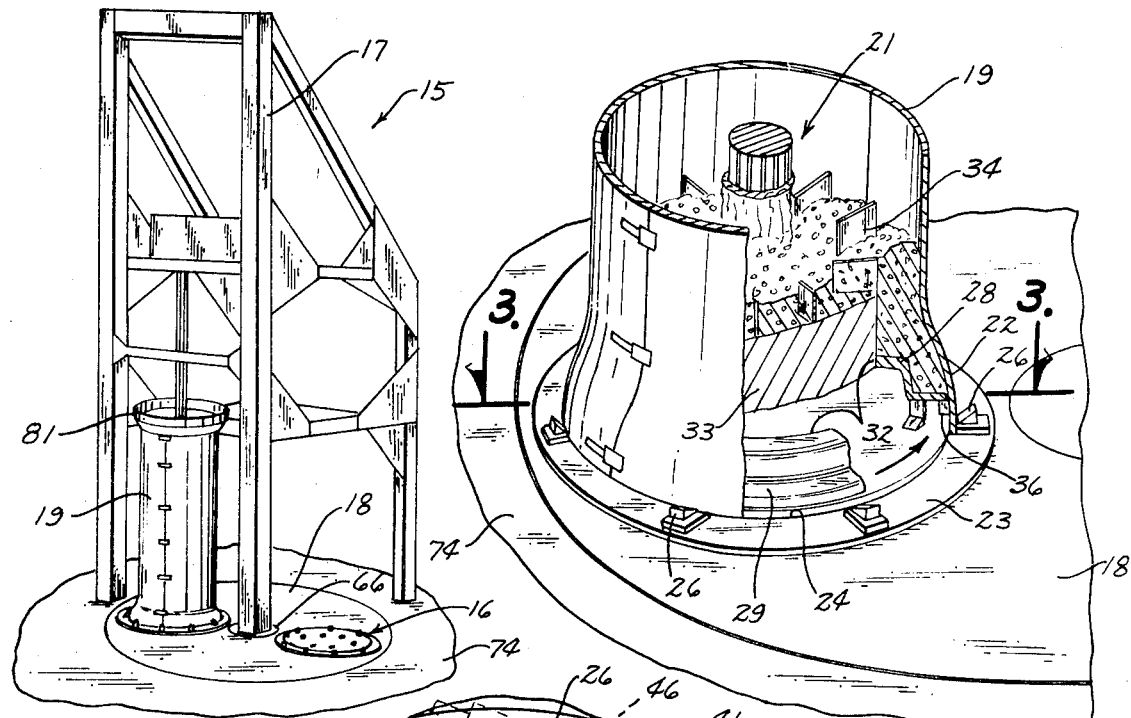
Fig.1
Fig.2
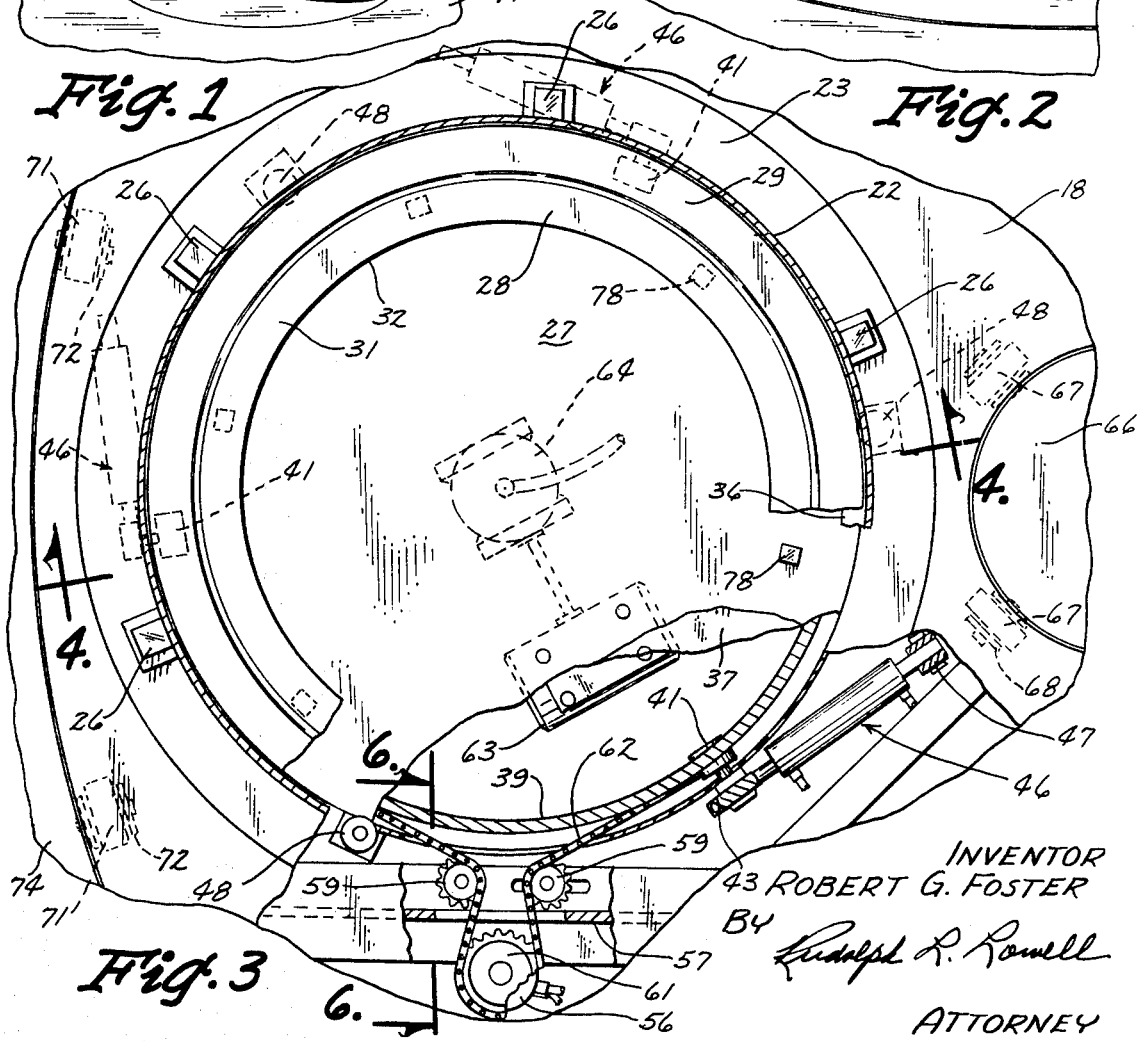
Fig.3
INVENTOR
ROBERT G. FOSTER
BY
Rudolph L. Lowell
ATTORNEY

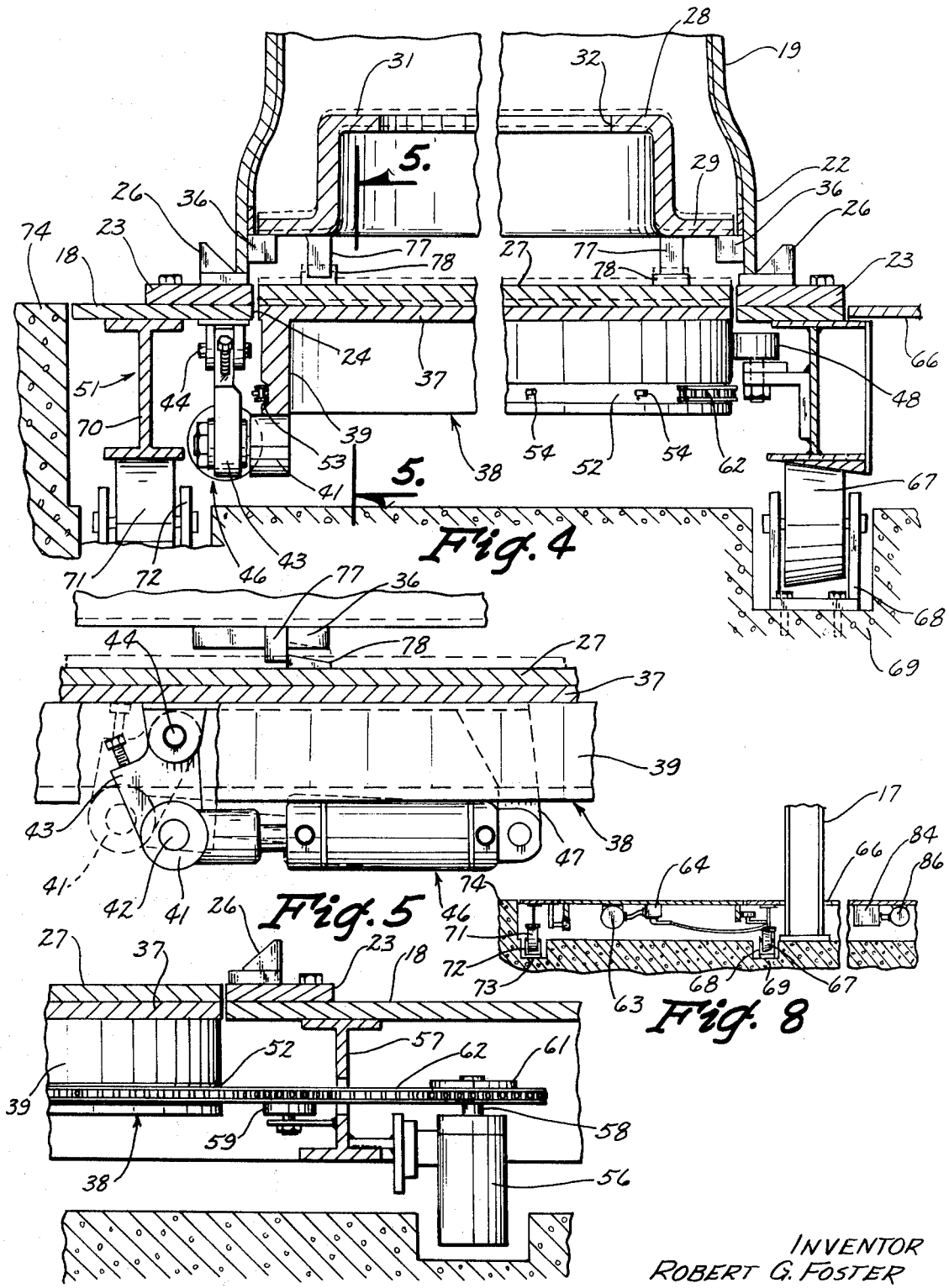

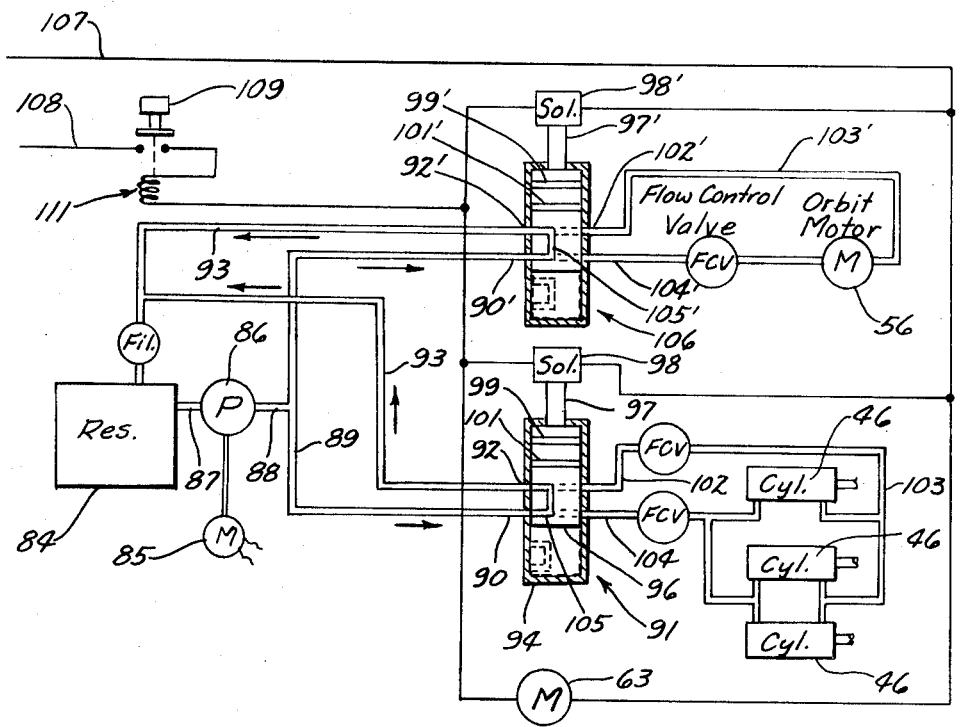
Fig. 7
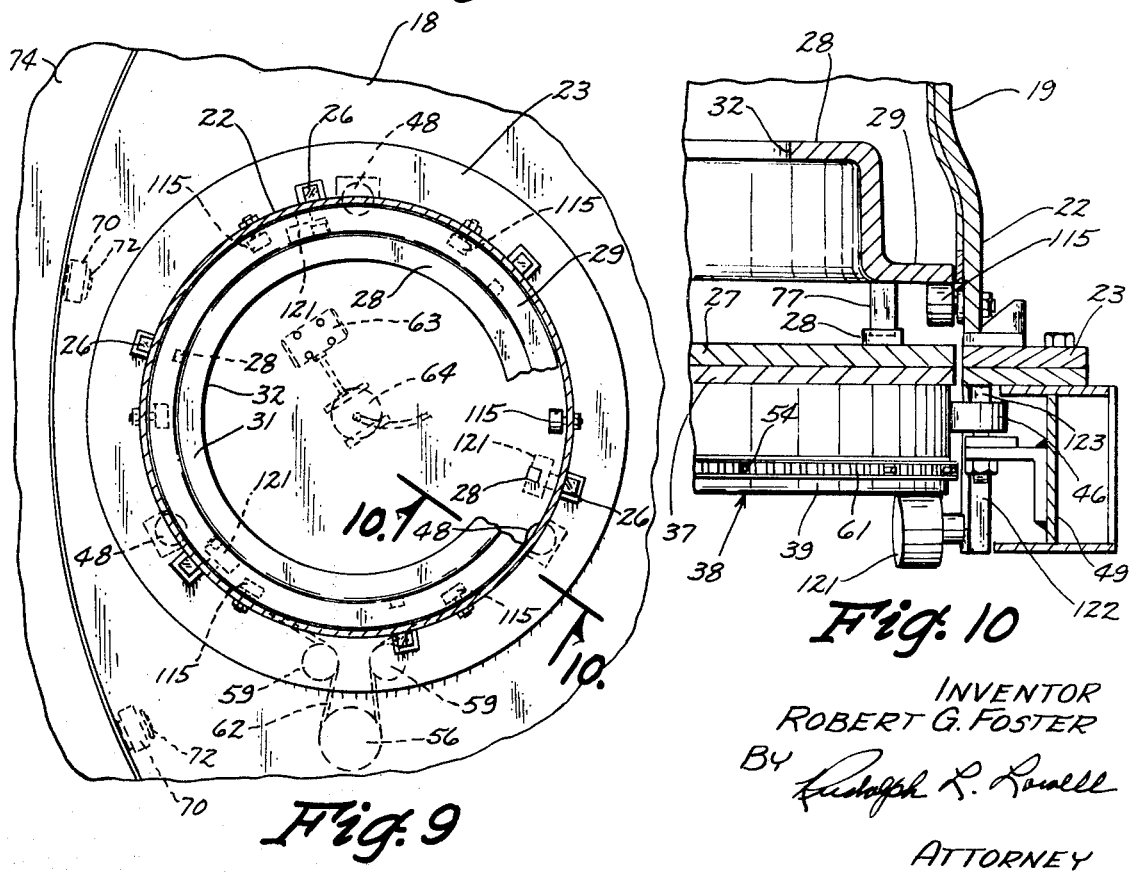
Fig. 9
Fig. 10
INVENTOR
ROBERT G. FOSTER
BY
ATTORNEY

United States Patent Office 3,518,732
Patented July 7, 1970

3,518,732
PIPE FORMING MACHINE WITH ROTATABLE PLATFORM CARRYING ROTATABLE SUPPORTING PLATE
Robert G. Foster, Boone, Iowa, assignor to Quinn Wire & Iron Works Inc., Boone, Iowa, a corporation of Iowa
Filed Dec. 4, 1967, Ser. No. 687,713
Int. Cl. B23g 21/22
U.S. Cl. 25—30
4 Claims

ABSTRACT OF THE DISCLOSURE

The pipe forming apparatus includes a platform having a circular opening for receiving in an opening-closing relation a rotatable circular plate member that is rotatably supported on rollers mounted from the underside of the platform. A pipe form, carried on the platform in a concentric relation with the opening, has inwardly projected radially extended mountings for supporting a pallet. When the pallet is resting on such mountings, the top surfaces of the platform and plate are in a substantially common plane with the pallet above and releasably engaged in a driven relation with the rotatable plate member. In the initial filling of the form the plate member is rotated and vibrated, to in turn rotate and vibrate the pallet, by structure located below and covered by the platform and plate member. Rotation and vibration of the pallet takes place for a predetermined time period during which the pipe form is filled to approximately the top level of the pallet. Concurrently with such vibration and rotation, the pallet may be lifted from the pipe form mounting to reduce friction and wear therebetween. On drippings or spill, that usually occurs during the pipe forming operation, are readily accessible on the top surface of the platform and plate member for easy and quick removal by a sweeping or shoveling operation.

SUMMARY OF THE INVENTION

The invention provides apparatus for rotating and vibrating a pallet relative to a pipe form wherein a circular rotatable plate member is received in an operating clearance relation within a circular opening formed in the platform to provide a substantially continuous planar surface. With the pipe form resting on the platform about the circular opening and the pallet supported on mountings extended radially inwardly of the lower end of the pipe form, the pallet is positioned above the plate member and engaged therewith in a driven relation. Vibration of the plate member concurrently with its rotation takes place for a predetermined time period providing for a concrete filling of the pipe form substantially to the level of the top of the pallet.

On completion of the pipe forming operation by a usual packer head, the pipe form and formed pipe therein are removed from the platform. By virtue of the substantially continuous surface formed by the platform and rotatable plate member, the cleanup of any spilled concrete is simply accomplished in a minimum of time to prepare the machine for another pipe forming operation. This clean-up operation is facilitated by the elimination of any floor pit for receiving the operating mechanisms of the machine and by the provision of a substantially continuous planar surface formed by the top surfaces of the platform and rotatable plate member.

During rotation of the pallet relative to the pipe form, a lift means for the plate member may be operated concurrently with the plate member vibrating and rotating means to lift the pallet out of engagement with the pipe form mountings during the time period that the plate member is being vibrated and rotated.

DETAILED DESCRIPTION OF THE INVENTION

Further objects, features and advantages of the invention will become apparent from the following description when taken in connection with the accompanying drawing in which:

FIG. 1 is a perspective view of the pipe forming machine embodying the pallet vibrating, rotating and lifting device of this invention;

FIG. 2 is an enlarged fragmentary perspective view, with some parts broken away and other parts shown in section, showing the pallet in assembly relation with the pipe former, a platform for supporting the pipe form and a rotatable plate member for rotating and vibrating the pallet;

FIG. 3 is an enlarged sectional view as seen along the line 3—3 in FIG. 2;

FIG. 4 is a sectional view taken along the line 4—4 in FIG. 3;

FIG. 5 is a sectional view as seen substantially along the line 5—5 in FIG. 4;

FIG. 6 is a sectional view taken along the line 6—6 in FIG. 3;

FIG. 7 is a diagrammatic illustration of the electrical and hydraulic control system for the pallet vibrating, rotating and lifting device;

FIG. 8 is a diagrammatic illustration showing the relative assembly of the turntable with the rotatable plate member for rotating and vibrating the pallet;

FIG. 9 is a sectional view illustrated similarly to FIG. 3 showing a modified form of the invention; and FIG. 10 is an enlarged sectional view taken along the line 10—10 in FIG. 9.

Referring to the drawing there is illustrated in FIG. 1 a pipe forming machine, indicated generally at 15, embodying the pallet vibrating, rotating and lifting device of this invention, which is shown generally at 16. The machine 15 includes an upright frame structure 17, and a horizontal platform 18 (FIGS. 1 and 2) for supporting a pipe form or mold 19 of a cylindrical shape. A packer unit 21 is suitably supported for vertical and rotational movement on the frame 17 for operative association, in a usual manner, with the pipe form 19.

The lower bell-end of the form 19 terminates in a cylindrical skirt 22 that rests on an annular flat ring 23 secured to the platform 18 in a concentric contiguous relation with a circular opening 24 formed in the platform 18. The platform 18 is illustrated as a turntable having a pair of the openings 24 arranged in diametric opposition for indexing and production work. A concentric relation of the pipe form 19 about the opening 24 is provided by cam guides 26 projected upwardly from the flat ring 23 and arranged in a circumferentially spaced relation on the ring.

Rotatable within an opening 24 (FIG. 4) is a horizontal circular plate member 27 of a size only slightly smaller than the size of the opening 24 so that the top surface of the plate member 27 forms a substantially continuous planar surface with the top surface of the platform 18, it being noted that the plate member 27 projects from the platform 18 only by the thickness of the flat ring 23 and that the guides, if desired, may be carried directly on the platform 18. A plate member 27 is provided for each circular opening 24 and forms part of the device 16 for lifting, rotating and vibrating a bell pallet 28.

The pallet 28 conforms to the shape of the lower bell end of the pipe form 19 and includes a lower annular radially outwardly projected flange 29, the peripheral edge of which is in contact engagement with the inner peripheral surface of the form skirt 22. A planar top wall 31 of the pallet 28 is formed with a central circular opening 32 to pass the cylindrical bottom section 33 (FIG. 2) of the packer head 34 that forms part of the packer unit 21.

The inner peripheral surface of the form skirt 22 (FIG. 2), adjacent the bottom edge of the pipe form 19, carries a series of circumferentially spaced inwardly projected mountings or lugs 36 for supporting the pallet 28 at the flange 29. With the flange 29 in contact engagement with the form skirt 22 the pallet 28 is thus positioned above and in coaxial alignment with the rotatable plate member 27.

A similar device 16 for lifting, rotating and vibrating a pallet 28 is provided for each of the openings 24 and since each device 16 is similar in construction and operation, and in its assembly with the platform 18 only one of the devices 16 is illustrated in detail in the drawings.

The plate member 27 (FIG. 4) is rigidly secured to and in an overlying relation with the top wall 37 of a combination sprocket and hub unit 38. The top wall 37 is of a circular shape corresponding in size to the plate member 27 and is integrally formed with a peripherally depending flange or hub 39. The lower face of the hub 39 is supported on a series of rollers 41 spaced circumferentially about the opening 24. Each roller 41 (FIG. 5) is rotatable on a shaft 42 that is carried at the lower end of a lift arm 43, the upper end of which is pivotally supported at 44 from the underside of the platform 18 for pivotal movement of the lift arm about an axis extended substantially radially of the opening 24. As best appears in FIG. 5, the axis of a pivot means 44, and the axis of rotation of a corresponding roller 41 are in a parallel relation.

Each lift arm 43 (FIGS. 4 and 5) is operated by a linearly extendible and retractable power unit 46, illustrated as a hydraulic cylinder and piston assembly, which is pivotally connected at one end on the roller shaft 42 and at its other end to the lower end of a lug member 47 that depends from and is secured to the underside of the platform 18. In response to the extension and retraction of the cylinder assemblies 46 the lower ends of the lift arms 43 are pivotally moved relative to the pivots 44 to raise and lower corresponding rollers 41 and in turn the plate member 27 which is supported on the rollers 41 through the combination sprocket and hub unit 38.

As illustrated in full lines in FIGS. 4 and 5, when the lift arms 43 are in a dependent position and the hydraulic cylinder assemblies 46 are retracted, the plate member 27 is in a lowered position wherein its top surface is substantially level with the top surface of the platform 18. On extension of the hydraulic cylinder assemblies 46 the lift arms 43 are moved to their raised positions, shown in dotted lines in FIGS. 4 and 5, to provide for a lifting of the pallet 28 from the pipe form mountings 36 for a purpose to be later described.

The hub member 39 is guided for rotation on the rollers 41 about an axis coincident with the form 19 and pallet 28 by a series of guide rollers 48 (FIGS. 3 and 4) that are carried on beam members 49 for rotation about vertical axes. The beam members 49 form part of a horizontal frame structure, indicated generally at 51, which carries the turntable 18. The rollers 48 are spaced circumferentially about the hub 39 in contact engagement with the upper portion of its outer peripheral surface.

The lower portion of the peripheral surface of the hub 39 is formed with an annular groove 52 that has a bottom wall 53. A series of pin members 54 are projected radially outwardly from the groove bottom wall 53 in a circumferentially spaced relation about the hub member 39 to form a sprocket gear on the hub member.

A hydraulic motor 56 (FIGS. 3 and 6) for driving the combination hub and sprocket unit 38, and in turn the plate member 27, is located below the turntable 18 and mounted on and to one side of a beam 57 that forms part of the frame structure 51. The motor 56 is arranged to one side of the platform opening 24 with its drive shaft 58 in an upright position. Also mounted on the beam 57 and to the side thereof opposite the motor 56 are a pair of horizontal idler sprockets 59 arranged so that a drive sprocket 61 on the motor shaft 58 is located centrally of and to one side of the idler sprockets 59. As clearly appears in FIG. 6 when the plate member 27 is in a lowered position, the groove 52 in the hub member 39 and the sprockets 59 and 61 lie in a common horizontal plane and are connected in operative association by a sprocket chain 62. On raising and lowering of the plate member 27, the chain 62 is retained in engagement with the pins or teeth 54 by virtue of its riding engagement within the groove 52.

A vibrator unit 63 (FIG. 8) of a commercially available and well-known electrical type, and including a collector ring assembly, is mounted to the under side of the top wall 37 of the combination unit 38 to vibrate the top wall 37 and in turn the plate member 27.

The frame structure 51 for supporting the platform 18 has a central portion 66 (FIGS. 4 and 8) that is ridable on rollers 67 which are suitably mounted in brackets 68 carried on foundation or bearing supports 69. A peripheral track 70 on the frame structure 51 is ridable on rollers 71 carried in brackets 72 that are mounted on foundation supports 73.

It is seen, therefore, that the lift arms 43 and hydraulic cylinder assemblies 46 are supported from the under side of the platform 18 and the vibrator units 63 from the under side of the top wall 37 of the combination sprocket and hub unit 38. Also the hydraulic motor 56 and power transmission means for rotating the plate member 27 are located below the top planar surfaces of the plate member 27 and platform 18 and within the vertical confines or thickness of the platform frame structure 51. As a result no pit is required for mounting such mechanisms. Likewise, the platform 18 and rotatable member 27 have their top planar surfaces substantially in the plane of the surrounding floor surface 74 to provide for an easy handling of the pipe forms 19 into and out of the machine 15.

In the use of the machine 15 a pipe form 19 is assembled on the platform or turntable 18 when one of the openings 24 (FIG. 1) is positioned outwardly from the upright frame 17. The bell pallet 28 is supported on the mountings 36 and within the form 19 to provide a desired shape for the lower end of the pipe to be formed within the form 19.

As shown in FIG. 4, the flange 29 of the pallet 28 inwardly of the form mountings 36 is provided with a series of circumferentially spaced depending lugs or fingers 77 for abutting engagement with corresponding upstanding cleats or stops projected upwardly from the plate member 27. The fingers 77 and cleats 78 thus form coacting releasable coupler members providing for a rotation of the pallet 28 in response to a rotation of the plate member 27.

The turnatble 18 is then rotated to move the upright pipe form 19 to its position shown in FIG. 1 where it is in an aligned position with the packer unit 21, it being understood that the packer head 34 is located above the form 19 at the time of such alignment. The packer head 34 is then lowered within the form 19 to a position extended below the bell pallet opening 32, shown in FIG. 2. A mud pan 81 (FIG. 1) is assembled on the upper end of the form 19 and is held in a fixed position thereon by means of a suitable hold down apparatus (not shown). The mud pan 81 includes form structure (not shown) for forming the desired shape on the upper end of the pipe to be formed within the form 19.

Concrete is then supplied from a hopper (not shown) to the mud pan 81 and into the form 19 by means of a trough or the like (not shown). On rotation of the packer head 34 the concrete is moved outwardly and packed between the packer head 34 and the form 19.

Concurrently with this initial filling of the form 19 the motor 56 and vibrator unit 63 are operated simultaneously with an extension of the hydraulic cylinder assemblies 46. As a result of such simultaneous operation the plate member 27 and the pallet 28 are simultaneously rotated, vibrated and elevated, with the extent of elevation being only that required to lift the pallet flange 29 out of engagement with the mountings 36 to facilitate rotation of the pallet 28. In this connection it is to be noted that the pallet 28 may be rotated and vibrated while in resting engagement on the mounting 36.

The simultaneous operation of the vibrator unit 63, hydraulic motor 56 and hydraulic cylinder assemblies 46 is continued for a predetermined period of time providing for the filling of the form 19 with concrete to approximately the level of the top planar wall 31 of the pallet 28. When this level is reached the pallet 28 is lowered onto the mountings 36 concurrently with the discontinuance of its vibration and rotation.

On a continued supply of concrete into the form 19, the packer head 34 is progressively raised in a well-known manner, concurrently with rotation thereof to continually pack concrete between the peripheral surface of the cyindrical portion 33 and the form 19. On withdrawal of the packer head 34 from the mud pan 81, the hold down apparatus (not shown) for the mud pan 81 is released and the mud pan raised clear of the form 19. On rotation of the turntable 18, the form 19 is carried to one side of the frame 17 for removal from the turntable 18 concurrently with the positioning of a second form 19 beneath the packer unit 21 for the forming of another pipe.

FIG. 7 illustrates diagrammatically the control system for operating the vibrator motor 63, hydraulic cylinder assemblies 46 and hydraulic motor 56. A hydraulic pump and reservoir unit 83, as shown generally in FIG. 8, is mounted on the frame structure 51 of the platform 18 and as indicated in FIG. 7 includes a reservoir 84 and pump 86 driven by an electrical motor 85. The pump 86 has an inlet 87 connected to the reservoir 84. The outlet 88 of the pump is connected to a pressure header line 89 having a first feed line 90 connected to a solenoid actuated valve unit 91 that controls the supply of oil to the hydraulic cylinder assemblies 46. Oil from the valve unit 91 is returned to the reservoir 84 through a valve outlet 92 and oil return line 93.

The valve unit 91 includes a cylindrical housing 94 for slidably receiving a spool or spindle type valve member 96 that is secured to a plunger 97 of a solenoid 98. The upper portion of the valve member 96 is formed with a pair of diametrically extending parallel oil passages 99 and 101. The passage 99 is movable into and out of registration with the valve unit outlet 92 and an oil return connection 102 that is connected with an exhaust or return line 103, common to all of the hydraulic assemblies 46. The oil passage 101 is movable into and out of registration with the feed line 90 and an oil supply outlet 104 on the valve unit 91 that is common to all of the hydraulic cylinder assemblies 46.

When the solenoid plunger 97 is retracted, the oil passages 99 and 101 are moved to close positions therefor. Concurrently with the retraction of the solenoid plunger 97 an oil bypass passage 105, formed in the lower portion of the valve member 96, is fluid connected between the outlet 92 and the feed line 90 to return oil under pressure from the feed line 90 directly through the outlet 92 and line 93 to the reservoir 84.

A solenoid valve unit 106, identical to the valve unit 91, controls the supply and release of oil under pressure to the hydraulic motor 56. Like numerals primed, therefore, are applied to the valve unit 106 to designate like parts in the valve unit 91. The oil passage 99' is movable into and out of registration with the oil return connection 102' for the motor 56 and the valve unit outlet 92' which is connected to the reservoir oil return line 93. Likewise, the oil passage 101' is movable into and out of registration with the feed line 90' and the oil supply outlet 104' for the motor 56. When the solenoid plunger 97' is retracted and the oil passages 99' and 101' are closed, oil from the feed line 90' is by-passed through the passage 105' directly through the valve unit outlet 92' and line 93 to the reservoir 84.

The electrical circuitry includes power lines 107 and 108 (FIG. 7) with the solenoids 98 and 98' and vibrator motor 63 connected in parallel therebetween. A starter switch 109 of a push button type is connected in series in the line 108 and actuates a time delay control relay, indicated generally at 111, to simultaneously operate the solenoids 98 and 98' and vibrator motor 63 for a predetermined period of time, and after such time to simultaneously deenergize the solenoids and stop the motor 63. As previously described, this time period is of a duration to provide for a filling of the form 19 with concrete to substantially the level of the planar top wall 31 of the pallet 28. It is also to be understood that in the operation of the machine 15 the fluid pump 86 would be continuously operated. It is also apparent that the oil motor 56 could be of electrical type and that the lift arms 43 can also be operated electrically, if so desired.

The modified form of the invention shown in FIGS. 9 and 10 is similar to the structure described particularly in connection with FIGS. 4, 5 and 6 except for the elimination of the hydraulic cylinder assemblies 46, lift arms 43 and friction or bearing mountings 36. Like numerals of reference, therefore, will be used to indicate like parts.

In the modified form of the invention of FIGS. 9 and 10 the flange 29 of the pallet 28 is supported on roller mountings 115 in lieu of the friction or bearing mountings 36 described in connection with FIG. 4. Although the pallet 28 may be rotated while in a supported position on the bearing mountings 36, it is apparent that appreciable friction and wear might occur. By the use of the roller mountings 115, the pallet 28 is rotatable with a minimum of wear while in a continuously supported position on the rollers 115. As a result, it is unnecessary to lift the pallet 28 during its rotating and vibrating period. Thus, as shown in FIG. 10, rollers 121 for supporting the combination hub and sprocket unit 38 are carried at the lower ends of arms 122 having their upper ends 123 rigidly secured to the under side of the platform 118. The rollers 121 are located relative to the platform 18 such that the pallet 28 is fully supported on the rollers 115 while providing for an engagement between the pallet fingers 77 and the cleats 78 on the rotatable plate member 27.

During a filling of the form 19, the vibrator unit 63 and motor 56 are simultaneously operated for a predetermined period of time, providing for a filling of the form 19 to substantially the level of the top wall 31 of the pallet 28. After such time vibration and rotation of the pallet 28 are simultaneously discontinued.

Although the above invention has been described with respect to preferred embodiments thereof, it is to be understood that it is not to be so limited since changes and modifications can be made therein which are within the full intended scope of this invention as defined by the appended claims.

I claim:

1. In a pipe forming machine having a rotatable platform with a circular opening thereon for supporting a pipe form in a concentric relation with and about said opening, apparatus for rotating and vibrating a pallet relative to said pipe form comprising:
    (a) a rotatable circular plate member,
    (b) means carried on said platform below the top surface thereof rotatably supporting said plate member for rotation within said opening at a position wherein the top surface of said plate member is substantially in the plane of the top surface of said platform,
    (c) means on said pipe form for rotatably supporting said pallet, (d) means for rotating said plate member mounted on and located below the top surface of said platform,
(e) releasably engageable coacting means on said pallet and plate member for connecting said pallet in a driven relation with said plate member,
(f) vibrating means for said plate member carried on the underside thereof, and
(g) means for simultaneously operating said vibrating means and rotating means for a time period providing for the supply of concrete into said pipe form to a position substantially level with the top surface of said pallet.

2. In a pipe forming machine according to claim 1, wherein:
(a) said rotating means includes a depending annular flange on said supporting plate having a circumferential groove in the outer peripheral surface thereof, said groove having a bottom wall,
(b) a plurality of circumferentially spaced pins extended radially from said bottom wall,
(c) a power unit mounted from the lower side of said platform adjacent said circular opening having a drive sprocket arranged in a horizontal plane common to said groove, and
(d) a sprocket chain operatively associated with said drive sprocket and trained about said flange within said groove for coacting engagement with said pins.

3. In a pipe forming machine having a rotatable platform with a circular opening therein for supporting a pipe form in a concentric relation with and about said opening, apparatus for lifting, rotating and vibrating a pallet relative to said pipe-form comprising:
(a) a rotatable circular pallet supporting plate positioned within said platform opening in a closing relation therewith,
(b) means on said pipe form for supporting said pallet independently of said supporting plate,
(c) means for rotating said supporting plate mounted on and located below the top surface of said platform and including a power unit,
(d) coacting means on said pallet and supporting plate for connecting said pallet in a driven relation with said supporting plate,
(e) vertically adjustable means depending from said platform for rotatably supporting said supporting plate,
(f) lift means carried on said platform below the top surface thereof for raising and lowering said adjustable means,
(g) means for vibrating said supporting plate carried on the under side of said supporting plate, and
(h) means for selectively controlling the operation of said power unit, lift means and vibrating means whereby said pallet is elevated out of engagement with the supporting means on said pipe form when said supporting plate is vibrated and rotated, and said supporting plate having its top surface substantially in the plane of the top surface of the platform when said pallet is in a lowered position on said pipe form supporting means.

4. In a pipe forming machine as defined in claim 3, wherein:
(a) said vertically adjustable means includes a series of pivoted arms, circumferentially spaced about said opening,
(b) means pivotally supporting one end of each arm from the underside of said platform for pivotal movement of the opposite end thereof about an axis extended substantially radially of said opening,
(c) rollers engageable with the under side of said supporting plate, each roller rotatably supported at said opposite end of each arm for rotation about an axis parallel to said radially extended axis, and
(d) said lift means includes a linearly extendible and retractable power unit for each arm pivotally connected at one end of said opposite end of a corresponding arm, and pivotally connected at the other end thereof to the underside of said platform.

References Cited

UNITED STATES PATENTS 2,980,978   4/1961   Marshall _____ 25—37 X
3,083,433   4/1963   Tiller _____ 25—39

ROBERT D. BALDWIN, Primary Examiner

U.S. Cl. X.R.

25—39